(12) United States Patent
Wojnowicz et al.

(10) Patent No.: US 11,544,358 B2
(45) Date of Patent: Jan. 3, 2023

(54) BAYESIAN CONTINUOUS USER AUTHENTICATION

(71) Applicant: Cylance Inc., Irvine, CA (US)

(72) Inventors: Michael Thomas Wojnowicz, Irvine, CA (US); Dinh Huu Nguyen, Santa Ana, CA (US); Alexander Wolfe Kohn, Irvine, CA (US)

(73) Assignee: Cylance Inc., San Ramon, CA (US)

( * ) Notice: Subject to any disclaimer, the term of this patent is extended or adjusted under 35 U.S.C. 154(b) by 231 days.

(21) Appl. No.: 17/085,984

(22) Filed: Oct. 30, 2020

(65) Prior Publication Data

US 2022/0138292 A1    May 5, 2022

(51) Int. Cl.
*G06F 21/31* (2013.01)
*G06N 7/00* (2006.01)

(52) U.S. Cl.
CPC ........... *G06F 21/316* (2013.01); *G06N 7/005* (2013.01)

(58) Field of Classification Search
CPC .............................. G06F 21/316; G06N 7/005
See application file for complete search history.

(56) References Cited

U.S. PATENT DOCUMENTS

| 10,375,095 | B1* | 8/2019 | Turcotte | H04L 63/1425 |
| 2016/0379644 | A1* | 12/2016 | Li | G06F 21/32 |
| | | | | 704/273 |
| 2017/0242995 | A1* | 8/2017 | Bassenye-Mukasa | G06F 16/24575 |
| 2018/0069867 | A1* | 3/2018 | Grajek | H04W 12/068 |
| 2018/0082304 | A1* | 3/2018 | Summerlin | G06Q 20/3229 |
| 2019/0332876 | A1 | 10/2019 | Khitrov et al. | |

OTHER PUBLICATIONS

Extended European Search Report issued for EP Application No. 21205519.8 dated Feb. 23, 2022.
Reynolds et al., "Automatic speaker recognition using Gaussian mixture speaker models." The Lincoln Laboratory Journal. v8.2; 1995.
Zhang et al., "Realization and improvement algorithm of GMM-UBM model in voiceprint recognition." 2018 Chinese Control and Decision Conference (CCDC). IEEE, 2018.

* cited by examiner

*Primary Examiner* — Hee K Song
(74) *Attorney, Agent, or Firm* — Jones Day (57) ABSTRACT

Bayesian continuous user authentication can be obtained by receiving observed behavior data that collectively characterizes interaction of an active user with at least one computing device or software application. A sequence of events within the observed behavior data can be identified and scored using a universal background model that generates first scores that characterize an extent to which each event or history of events is anomalous for a particular population of users. Further, the events are scored using a user model that generates second scores that characterizes an extent to which each event or history of events is anomalous for the particular user who owns the account. The first scores and the second scores are smoothed using a smoothing function. A probability that the active user is the account owner associated with the user model is determined based on the smoothed first scores and the smoothed second scores.

20 Claims, 3 Drawing Sheets

BAYESIAN CONTINUOUS USER AUTHENTICATION

TECHNICAL FIELD

The subject matter described herein relates to techniques for continuously authenticating a user of a computing device and/or software application.

BACKGROUND

Traditional techniques for authenticating a user to access a computing device and/or software application require login credentials typically including a username, password, and in some cases, a multi-factor authentication technique such as a code or biometric data. While such authentication techniques are helpful in initially confirming the identity and access level of the user, they offer little, if any protection, when login credentials are stolen or otherwise obtained by malicious actors.

SUMMARY

In one aspect, Bayesian continuous user authentication can be obtained by continuously receiving a sequence of observed behavior data that collectively characterizes interaction of an active user with at least one computing device or software application, wherein the active user is presumed to be the account owner, that is, the user associated with login credentials. A sequence of events within the observed behavior data can be identified. Each of the events are scored using a universal background model that generates first scores that characterize an extent to which each event or history of events is anomalous for a particular population of users. Further, each of the events are scored using a user model that generates second scores that characterizes an extent to which each event or history of events is anomalous for the particular user who owns the account. The first scores and the second scores are smoothed using a smoothing function. A probability that the active user is the account owner associated with the user model is determined based on the smoothed first scores and the smoothed second scores. Data can then be provided which characterizes the determined probability.

In some variations, after login credentials are received for the account owner, a user model is selected among a plurality of available user models which is associated with the login credential.

The smoothing function can upweight the first scores and/or the second scores based on recency.

The observed behavior data can include one or more of: keystroke data, logon activity, mouse movements, initiated processes, network activity, registry activity, file activity. The observed behavior data can include one or more of: a timestamp, an active process identifier, a device identifier, keystroke information, mouse information, process start information, network activity information, registry activity information, file activity information, logon activity information, account name, computer name, event code, logon process, logon type, record number, subject, or a source network IP address. The observed behavior data can include one or more of: a timestamp, an active process identifier, a device identifier, keystroke information (including typed character with upstroke vs. downstroke), mouse information (including spatial coordinates), process start information (including identifiers for the process start and process start parent, the command line expression used to execute a process that is started and its parent, and the file location of the process that is started and its parent), network activity information (including the instigating process identifier, the source IP address, destination IP address, source port, destination port, packet size, and incoming vs. outgoing direction), registry activity information (including the instigating process identifier, type of registry change, and whether the event occurs in a registry location that determines persistence), file activity information (including the instigating process identifier, activity type (create, delete, etc.), whether it is alternating data stream (true or false); whether it is delete pending (true or false); whether it is a directory (true or false); whether it is hidden (true or false); whether it is on removable drive (true or false; whether it is read only (true or false); its suspected file type (for example pdf, PE, etc.); its write position (where in file to write), and logon activity information (including account name (for example administrator, guest, etc.), computer name, event code (for example 4624, 4625, etc.), logon process (for example Advapi, Kerberos, etc.), logon type (for example, interactive, unlock, etc.), record number (an enumeration of logon event), subject (that accompanies each event code, for example "An account was successfully logged on"), and/or a workstation name (name of computer user is sitting at).

The smoothing function can include an exponential moving average smoothing function with, can optionally, include bias correction.

The universal background model can be a mixture model trained using historical observed behavior data from a population of users that interacted with the at least one computing device or software application. The mixture model can be a mixture of distributions from an exponential family. The mixture of distributions from the exponential family can be a Gaussian mixture model.

The provided data can include a posterior user probability where smoothing is used to construct the likelihood. The smoothing can be exponential smoothing.

The joint likelihoods for both the user model and universal background models can be defined by the equation below $$P_{ema}(E_{1:T} | U_i) = \prod_{t=1}^{T} P(E_t | U_i)^{\alpha(1-\alpha)^{T-t}}$$

where E1:T are behavioral events 1, . . . , T that have been observed so far, where $U_i=U_s$ refers to an event where the active user is the account owner, where $U_i=U_o$ refers to the event where the active user is a person other than the account owner, where $P(E_t|U_i)$ is the likelihood of behavioral event $E_t$ assuming that the active user is $U_i$, where $P(E_t|U_s)$ is a probability score given by the user model, where $P(E_t|U_o)$ is a probability score given by the universal background model, and where a refers to a smoothing parameter for an exponential moving average with bias correction.

The posterior user probability with exponentially smoothed log likelihoods can be defined by:

$$P(U_s | E_{1:T}) = \frac{P_{ema}(E_{1:T} | U_s)P(U_s)}{P_{ema}(E_{1:T} | U_s)P(U_s) + P_{ema}(E_{1:T} | U_o)P(U_o)}$$

where $P(U_s)$ refers to a prior probability that the active user is the presumed user, and where $P(U_o)=1-P(U_s)$ refers to a prior probability that the active user is not the presumed user.

Access to the at least one computing device or software application can be prevented or otherwise limited or restricted when the probability is above a threshold. Limiting access can include one or more of: reducing permissions granted to the active user to the at least one computing device or software application, preventing access to the at least one computing device or software application, triggering an endpoint detection and response routine to log actions of active the user, or logging the observed behavior data.

In some variations, the first scores generated by the universal background model and the second scores generated the user model are both probability scores that are represented as likelihoods.

Non-transitory computer program products (i.e., physically embodied computer program products, non-transitory computer readable media, etc.) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to advanced techniques for continuously authenticating a user of a computing device and/or software application. In particular, as will be described in further detail below, a universal background model (sometimes referred to herein as UBM) based on user interaction for a population of users is used in connection with a user-specific model to determine, based on the observed behavior of the user, a probability that the user at any given time is the account owner, i.e., the user associated with the login credentials. In some variations, a Bayesian approach is used which generates posterior user probabilities using a proxy likelihood constructed by exponential smoothing in the per-observation log likelihood terms.

Figure 1:
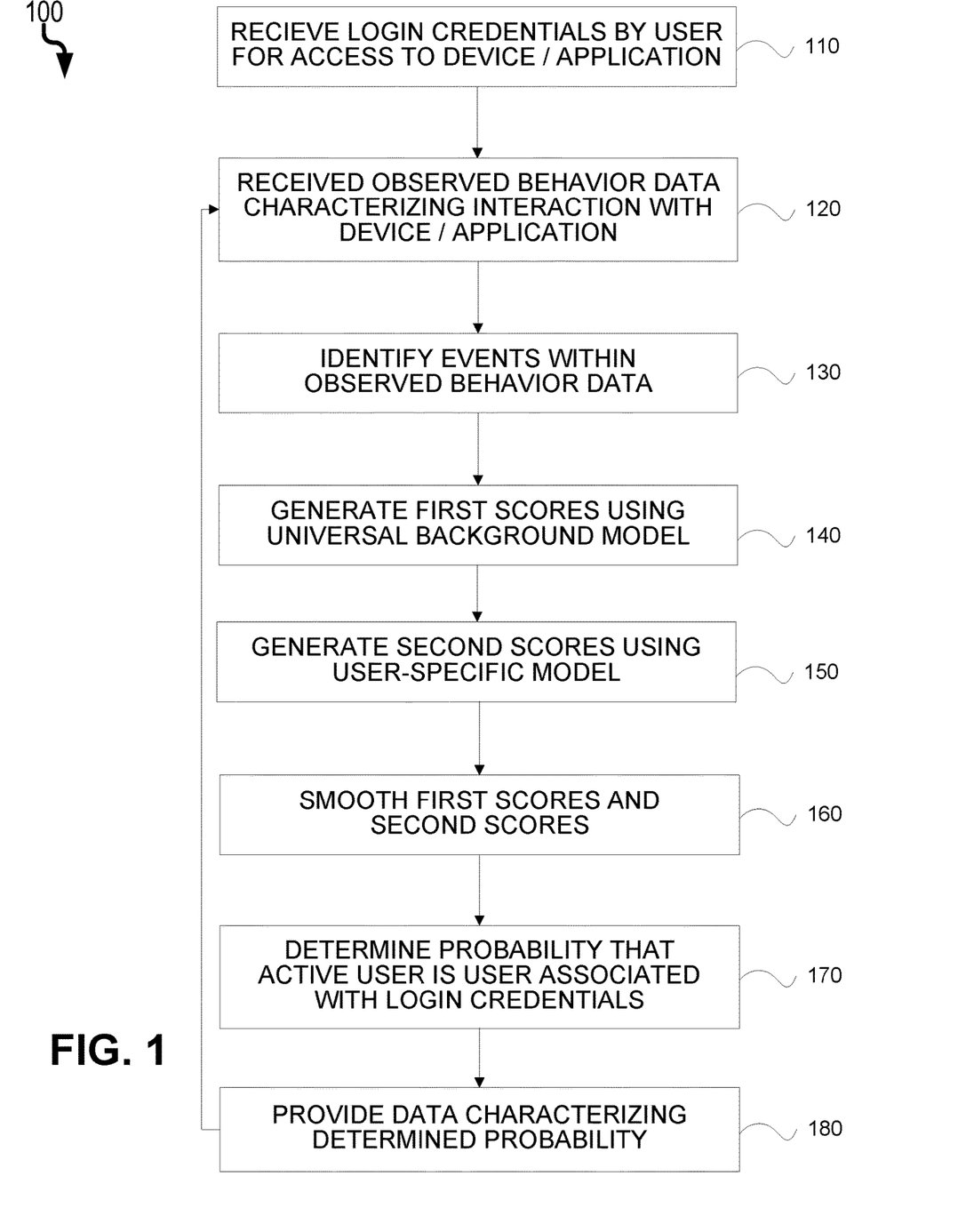
FIG. 1 is a process flow diagram illustrating continuous user authentication using a combination of a universal background model and a user-specific model.

Initially, with reference to diagram 100 of FIG. 1, at 110, login credentials associated with the account owner are entered (for example, via a graphical user interface and/or by using one or more biometric sensors, etc.). After successfully entering the login credentials, at 120, an iterative process commences in which observed user behavior is monitored. This observed user behavior relates to aspects of the computing device, software application(s), operating system, and/or network activity generated in connection with the user's interaction with at least one computing device and/or one software application.

The observed behavior data can include one or more of: a timestamp, an active process identifier, a device identifier, keystroke information (including typed character with upstroke vs. downstroke), mouse information (including spatial coordinates), process start information (including identifiers for the process start and process start parent), the command line expression used to execute a process that is started and its parent, and the file location of the process that is started and its parent), network activity information (including the instigating process identifier), the source IP address, destination IP address, source port, destination port, packet size, and incoming vs. outgoing direction), registry activity information (including the instigating process identifier), type of registry change, and whether the event occurs in a registry location that determines persistence), file activity information (including the instigating process identifier, activity type (create, delete, etc.), whether it is alternating data stream (true or false); whether it is delete pending (true or false); whether it is a directory (true or false); whether it is hidden (true or false); whether it is on removable drive (true or false; whether it is read only (true or false); its suspected file type (for example pdf, PE, etc.); its write position (where in file to write), and logon activity information (including account name (for example administrator, guest, etc.), computer name, event code (for example 4624, 4625, etc.), logon process (for example Advapi, Kerberos, etc.), logon type (for example, interactive, unlock, etc.), record number (an enumeration of logon event), subject (that accompanies each event code, for example "An account was successfully logged on"), a source network IP address, and a workstation name (name of computer user is sitting at).

Further, the observed user behavior can characterize actions of the active user (which might not be the account owner) including how many times that a particular file was accessed, how the particular file was used, when the particular file was first detected, location of a registry persistence point, use of a registry by a software routine to allow itself to persist after a reboot, registry keys being used for malware persistence to survive reboots, files being created or modified with content that can be directly executed or interpreted for execution, files being downloaded that contain executable or interpretable code, processes being created with excessive or unexpected permissions, users with excessive permissions or users obtaining permissions through non-standard mechanisms, network connections that are used in non-standard ways, network connections that are used in ways that exhibit malicious command and control activities, network connections that are used to exfiltrate files that contain sensitive information, network connections that connect to IP addresses that are considered suspect due to geo-location or reputation, processes that exhibit control over or inject code into other processes, processes that change user ownership during execution, and the like.

Using data characterizing the observed user behavior, at 130, one or more sequence of events can be identified. Such identification can be performed using various techniques including which can involve parsing, vectorization, and the like to represent raw data at a higher level of abstraction which is more useful for modeling. For instance, a sequence of raw keystroke events of the form (timestamp, character, upstroke or downstroke) may be represented downstream as a sequence of n-gram duration vectors, where an n-gram duration vector contains the durations of the button presses and transitions for each of n sequentially typed characters. Events can then be identified from these n-gram duration vectors (e.g., the event that the Mahalanobis distance is less than some quantity), and such events can be assigned probability scores.

The sequence of events can be input, at 140, into a universal background model which generates first scores indicating whether the events, a grouping of events, and/or the entire sequence of events is anomalous, unexpected, or otherwise atypical in relation to a population of users. In some cases, the universal background model is trained using observed behavior data/events from the population of the users when accessing the same computing device(s) and/or software application(s) while, in other cases, the universal background model is trained using observed behavior data/events from the population of the users when accessing different computing device(s) and/or different software application(s). Further, in some cases, the universal background model is trained with a representative population of benign users, whereas in other cases, the universal background model is trained with a representative population of malicious users, and in still other cases, the universal background model trained with a representative population of both malicious and benign users.

In addition, the sequence of events can be input, at 150, into a user model (i.e., a model specific to the user associated with the login credentials) to generate second scores indicating whether the events, a grouping of events, and/or the entire sequence of events is anomalous, unexpected, or otherwise atypical in relation to past observed behavior of the user. In some cases, the user model is trained using observed behavior data/events from the user when accessing the same computing device(s) and/or software application(s) while, in other cases, the universal background model is trained using observed behavior data/events from the user when accessing different computing device(s) and/or different software application(s).

Subsequently, at 160, a smoothing function can be used to weight the first scores and the second scores (e.g., upweight recent scores, etc.). A probability can then be determined, at 170, based on the smoothed first scores and the smoothed second scores, that the active user is the user associated with the user model/login credentials. Thereafter, at 180, data can be provided (e.g., loaded into memory, stored in physical persistence, displayed in a graphical user interface, transmitted to a remote computing devices, etc.) indicating the probability. The operations of 120-180 can be implemented as an iterative process so that as additional user behavior data is received, the probability can be update/modified (thus providing continuous user authentication). For example, a new probability can be provided, at 180, every time or potentially every time there is a new datum, at 120, where a datum could be something as fine-grained as a half keystroke, a change in mouse coordinates at some sampling rate, a new process start, and the like.

Let $U^s$ denote a finite population of users, $U_s \in U^s$ denote a particular user (which is sometimes referred to herein as the presumed user, account owner, or self), $X = \{X_t\}_{t=1}^T$ denote a sequence of observed raw behavioral data, and $E_{1:T} = \{E_t\}_{t=1}^T$ denote a sequence of parsed events determined by the raw behavioral data. In the presentation herein, we assume that $E_t = f(X_t)$ for each t. This assumption is often just a convenient fiction, and only approximately true, since, in practice, each $E_t$ can depend on observations over a small lookback window, $X_t, \ldots, X_{t-h}$. For instance, for keystrokes behavioral data, each X may contain the tuple (timestamp, character identity, upstroke or downstroke), and $E_t$ may be the event that the Mahalanobis distance of the (2n−1)-dimensional duration vector of a typed n-gram with respect to the user's learned distribution of duration vectors for that n-gram is smaller than or equal to the observed Mahalanobis distance. In this example, a single raw input, $X_t$, describes only a half of a keystroke, so when working with, say, bigrams (n=2), at least four raw observations, $X_t, \ldots, X_{t-3}$, would be needed to construct $E_t$.

The user model for a given account owner, $U_s$, maps a stream of observed raw behavioral data (i.e., the observed behavior data) to a stream of event scores (i.e., the second scores) where each event score takes the form $P(E_t|U_s)$. By Bayes law, the posterior probability that the self has generated the event history can be determined by $$P(U_s \mid E_{1:T}) = \frac{P(E_{1:T} \mid U_s)P(U_s)}{P(E_{1:T})} \tag{1.1}$$

For any given user $U_s$, the goal is to determine if that user or some other user is generating the data, so $U = \{U_s, U_o\}$ (where the subscripts are meant to suggest self and other) can be decomposed such that the denominator of (1.1) decomposes as $$P(E_{1:T}) = P(E_{1:T}|U_s)P(U_s) + P(E_{1:T}|U_o)P(U_o) \tag{1.2}$$

and $P(E_{1:T}|U_o)$ is taken to be a joint likelihood of the parsed events as given by a universal background model. The universal background model is a model which averages across many user models, e.g. a mixture model where the mixture is taken over a representative set of users which may or may not include malicious users. Note that $P(U_s)$ and $P(U_o)$ are prior probabilities, and $P(U_s) + P(U_o) = 1$.

The joint conditionals, $P(E_{1:T}|U_i)$ for i in {o, s}, can then be factorized. The typical independent and identical distributed (i.i.d) assumption would lead the following to be used:

$$P_{iid}(E_{1:T} \mid U_i) = \prod_{t=1}^{T} P(E_t \mid U_i) = \left( \prod_{t=1}^{T} P(E_t \mid U_i)^{1/T} \right)^T \tag{1.3}$$

However, instead, the following generalization can be used:

$$P_{general}(E_{1:T} \mid U_i) \left( \prod_{t=1}^{T} P(E_t \mid U_i)^{w_t^T / \Sigma_{t=1}^T w_t^T} \right)^{\Sigma_{t=1}^T w_t^T} \tag{1.4}$$

where it is noted that
- When $w_t^T = 1$ uniformly, (1.4) reduces to (1.3) as a special case;
- When $w_t^T \neq 1$, P_general does not satisfy countable additivity, and so P_general is not a probability measure.
- When $w_t^T$ is a weight given by a smoother, a method for upweighting recent event scores can be utilized;
- $\Sigma_{t=1}^T w_t^T$ is interpreted as the effective sample size; and
- $w_1^T / \Sigma_{t=1}^T w_t^T$ is interpreted as an event score weight.

The generalization in (1.4) supports the construction of a likelihood which upweights the contribution of observations in accordance with their recency. For instance, the logarithm of the event scores can be smoothed by means of an exponential moving average with parameter $\alpha$, where $\alpha$ is the weight on an incoming value, and with bias correction, thereby determining a value, $w_t^{\alpha, T}$, for (1.4). Equivalently, $w_t^{\alpha, T}$ is the weight given to terms by an exponential moving average with parameter $\alpha$, without bias correction, and with initial value of 0.0. Therefore, event score weights can be as follows:

$$\frac{w_t^{\alpha,T}}{\sum_{t=1}^{T} w_t^{\alpha,T}} = \frac{\alpha(1-\alpha)^{T-t}}{1-(1-\alpha)^T} \quad (1.5)$$

with effective sample size $$\sum_{t=1}^{T} w_t^{\alpha,T} = 1-(1-\alpha)^T \quad (1.6)$$

which incidentally equals the bias correction term.

By substituting (1.5) and (1.6) into (1.4), the following can be obtained:

$$P_{ema}(E_{1:T} \mid U_i) = \prod_{t=1}^{T} P(E_t \mid U_i)^{\alpha(1-\alpha)^{T-t}} \quad (1.7)$$

More specifically, this is a joint likelihood of behavioral events where an exponential moving average has been applied to the logarithms of the likelihoods of the individual behavioral events.

By substituting (1.7) into (1.2) and (1.1), a posterior user probability can be defined as follows:

$$P(U_s \mid E_{1:T}) = \frac{P_{ema}(E_{1:T} \mid U_s)P(U_s)}{P_{ema}(E_{1:T} \mid U_s)P(U_s) + P_{ema}(E_{1:T} \mid U_o)P(U_o)} \quad (1.8)$$

Figure 2:
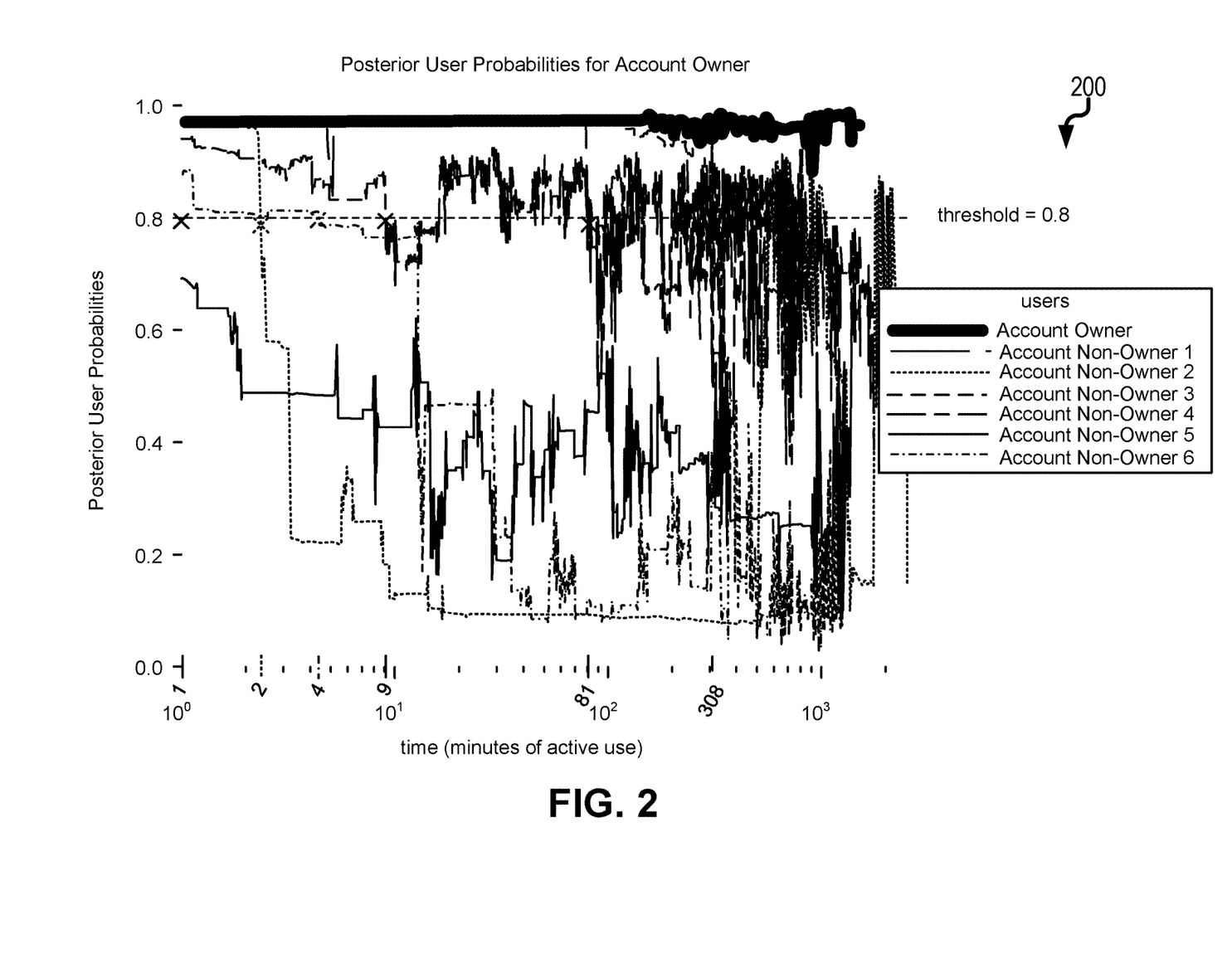
FIG. 2 is a diagram illustrating user probability measurements for a plurality of users.

The posterior user probability, $P(U_s|E_{1:T})$, is the estimated probability that the account owner (i.e., the presumed user) is the one (i.e., the active user) using the device, given the behavior events observed so far. This value is the actionable value for continuous user authentication; if it dips below a threshold, remediation may be taken (such as preventing or limiting access to some computing device or software application). For an example, with reference to diagram 200 of FIG. 2, probability scores for an account owner having a user-specific model is compared to those of six other users.

The reporting of posterior user probabilities for the purpose of informing decisions about preventing or limiting user access to a device or software application confers at least the following technical advantages.

Interpretability and Actionability.

Model-based approaches to continuous authentication would more commonly make decisions using an event score, $P(E_t|U)$, or a smoothed history of event scores. However, the interpretation of such quantities is typically not straightforward. For example, what value should be considered "low" by a user authentication platform can vary as a wildly as a function of the properties of the behavioral data (e.g., the data rate) or the model applied to that data (e.g., its goodness of fit). This makes it difficult to move directly from an event score or a history of event scores into a decision. In contrast, $P(U|E_t)$ has a clear interpretation, and is more directly relevant to a decision about access: it is the estimated probability that the user is who they say they are, given the data (and, implicitly, the trained model).

Filtering Out of Anomalies that are not Informative to the Goal of Continuous User Authentication.

A fundamental issue for anomaly detection models is that they can easily report uninteresting, "non-informative" anomalies, that is, anomalies that are not relevant to some eventual decision. (In this case, the decision to be made concerns limiting or preventing access, and this decision is made in part or in whole based on the model's belief about who is currently using the device—the owner of a user account, or some other user.) For an example of a non-informative anomaly in the context of continuous authentication, consider a situation where somebody accidentally drags their elbow across the keyboard. This behavior would yield low event scores—and hence a typical anomaly detector would raise an alert. However, this situation does not suggest that a different person is sitting at your computer, typing; indeed, it is unlikely that any human would type that quickly under natural circumstances. The posterior user probability returned by Equation (1.8) corrects for such "non-informative anomalies". While the numerator in Equation (1.8) would presumably be lowered, reflecting that the behavior is anomalous for the owner of the particular user account of interest, the denominator in Equation (1.8), i.e. the evidence, would presumably be lowered as well, since the behavior would presumably be anomalous for most or all users in the universal background model.

Tracking of Non-Stationarities Induced by Changes in User Identity.

One might imagine using the scores from a user model and universal background model to report a Bayesian posterior user probability, as in (1.8), but with a more traditional likelihood imposing an i.i.d assumption, as in (1.3). Such a scheme would provide the advantages, mentioned so far, of interpretability/actionability and filtering out of non-interesting anomalies. However, this scheme would lead scores to become rigid over time. As the number of observations, T, grows, the joint likelihood ratio, $P(E_{1:T}|U_s)/P(E_{1:T}|U_o)$, will typically become astronomically large (i.e. move towards infinity) or astronomically small (i.e. move towards zero), depending on whether the observations typically favor the user model over the universal background model, or vice versa, respectively. Thus, the posterior user probability would typically become very close to 1 or very close to 0 as T grows. As a result, if the user were to switch from the account owner to some other user after a long period of scoring, it could easily take an exceedingly long time for the posterior user probability to override the contribution from earlier observations. In contrast, the joint likelihood of (1.7) uses smoothing to upweight the contributions of more recent observations, which makes it easier for the posterior user probability scores to track non-stationarities in the data (and, specifically, non-stationarities induced by a change in user identity).

In Bayesian models, the relative contributions of the likelihood and the prior on the posterior depend on the number of observations. An oft-observed property of traditional Bayesian models is that, as more observations are collected, the likelihood overwhelms the prior in determining the posterior. For instance, when the joint likelihood in (1.1) contains a conditional i.i.d assumption (1.3), the posterior distribution is proportional to $(\Pi_{t=1}^{T}P(E_t|U_i)^{1/T})^T P(U_i)$, that is, to the product of two terms: (1) a likelihood viewed as a typical likelihood $\Pi_{t=1}^{T}P(E_t|U_i)^{1/T}$ with exponent T and (2) a prior $P(U_i)$. Note that T=1.0 at the start of data collection and goes to infinity as more data is collected. So as more data is collected, the prior has diminishing influence on the posterior. More generally, when (1.4) is substituted into (1.1), the influence of the data, relative to the prior, on the posterior probability is quantified by the effective sample size $S=\Sigma_{t=1}^{T}w_t^T$. That is, the posterior distribution is proportional to $(\Pi_{t=1}^{T}P(E_t|U_i)^{w_t^T/S})^S P(U_i)$, which is a product of two terms: (1) a likelihood viewed as typical likelihood $\Pi_{t=1}^{T}P(E_t|U_i)^{w_t^T/S}$ with exponent S, and (2) a prior $P(U_i)$. For the highlighted use case in which $P_{general}=P_{ema}$, the effective sample size $S=1-(1-\alpha)^T$. So S equals some (typically small) a on the unit interval at the start of data collection and goes to 1.0 as more data is collected. That is, the user probability scores given by (1.8) have the property that initial values in the sequence are highly constrained by the prior, but after some transient period, the prior and data have approximately constant levels of influence on the posterior. Thus, by using $P_{ema}$ instead of $P_{iid}$ to construct user probability scores, desirable properties are obtained. First, the use of $P_{ema}$ limits the ability of the data to overwhelm the prior in determining the posterior, thereby supporting the tracking of non-stationarities described above. Second, and as is emphasized here, the use of $P_{ema}$ helps to control the fact that the exponential moving average is high variance when it has been applied to a small number of samples from a non-degenerate probability distribution.

Figure 3:
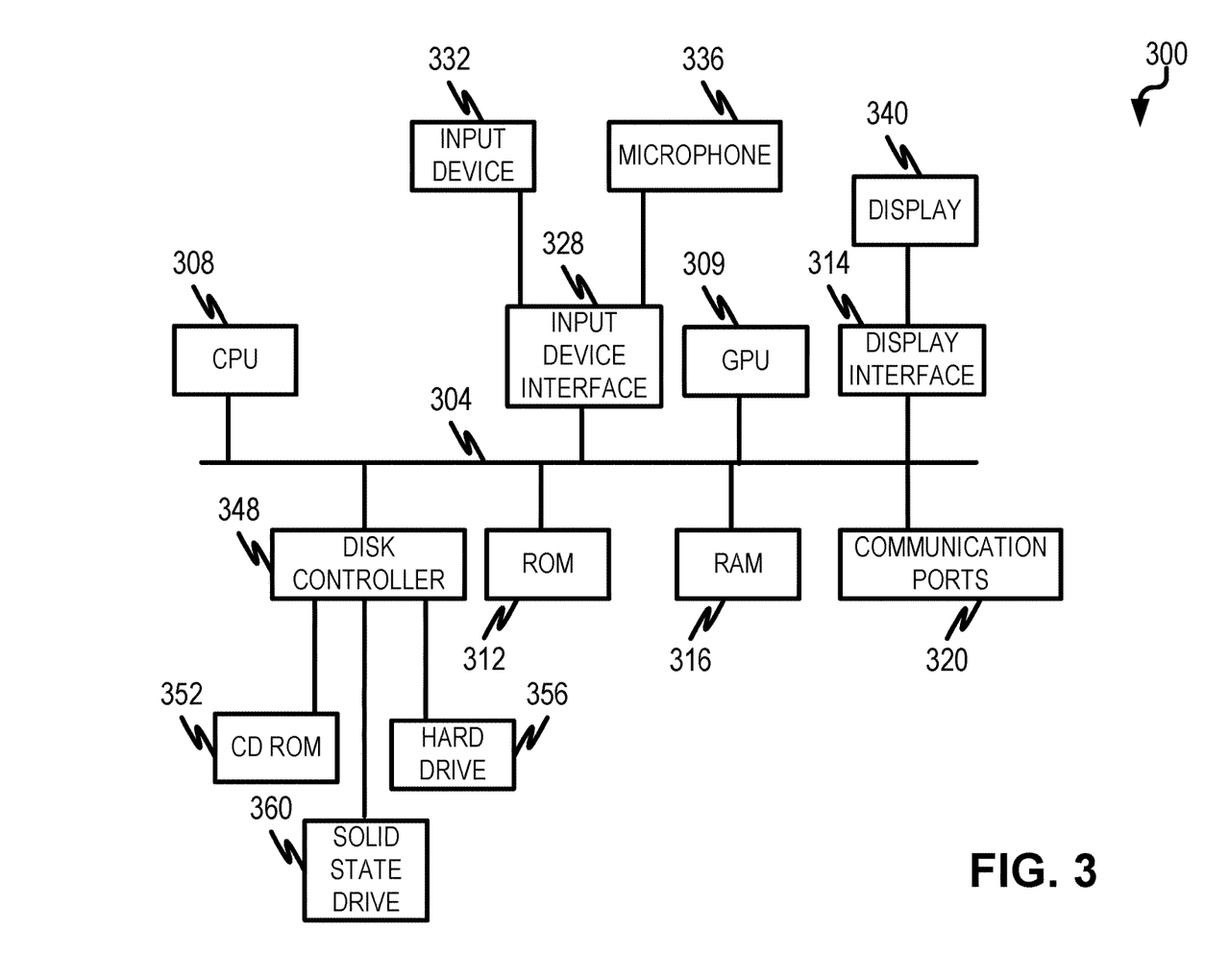
FIG. 3 is a diagram illustrating a computing device for implementing aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers) and/or a processing system 309 labeled GPU (graphical processing unit) can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal solid state drives such as 360, external or internal CD-ROM, CD-R, CD-RW or DVD drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
    iteratively receiving a plurality of sequences of observed behavior data each sequence of observed behavior data collectively characterizing interaction of an active user with at least one computing device or software application, wherein the active user is presumed to be an account owner having an account associated with login credentials;
    for each sequence of observed behavior data:
        identifying a sequence of events within the observed behavior data;
        scoring each of the events using a universal background model that generates first scores that characterize an extent to which each event or history of events is anomalous for a particular population of users;
        scoring each of the events using a user model that generates second scores that characterizes an extent to which each event or history of events is anomalous for the particular user who owns the account;
        smoothing the first scores and the second scores using a smoothing function that upweights the first scores and/or the second scores based on recency;
        determining, based on the smoothed first scores and the smoothed second scores, a probability that the active user is the account owner associated with the user model; and
        providing data indicating the probability.

2. The method of claim 1 further comprising:
    receiving login credentials for the account owner; and
    selecting, among a plurality of user models, the user model associated with the login credentials.

3. The method of claim 1, wherein the observed behavior data comprises one or more of: keystroke data, logon activity, mouse movements, initiated processes, network activity, registry activity, file activity.

4. The method of claim 1, wherein the observed behavior data comprises one or more of: a timestamp, an active process identifier, a device identifier, keystroke information, mouse information, process start information, network activity information, registry activity information, file activity information, logon activity information, account name, computer name, event code, logon process, logon type, record number, subject, or a source network IP address.

5. The method of claim 4, wherein the observed behavior data can include one or more of: a timestamp, an active process identifier, a device identifier, keystroke information, process start information, a command line expression used to execute a process that is started and its parent, network activity information, a source IP address, a destination IP address, a source port, a destination port, packet size, incoming or outgoing data flow direction, registry activity information, type of registry change, file activity information, whether a data stream is alternating, whether a delete is pending, whether a directory is accessed, whether a process is hidden, whether a removable drive is used, a suspected file type, a write position, logon activity information, computer name, event code, logon process, record number, subject, or a workstation name.

6. The method of claim 1, wherein the smoothing function comprises an exponential moving average smoothing function.

7. The method of claim 6, wherein the exponential moving average smoothing function has bias correction.

8. The method of claim 1, wherein the universal background model is a mixture model trained using historical observed behavior data from a population of users that interacted with the at least one computing device or software application.

9. The method of claim 8, wherein the mixture model is a mixture of distributions from an exponential family.

10. The method of claim 9, wherein the mixture of distributions from the exponential family is a Gaussian mixture model.

11. The method of claim 1, wherein the provided data comprises a posterior user probability where smoothing is used to construct a likelihood.

12. The method of claim 11, wherein the smoothing is exponential smoothing.

13. The method of claim 12, where joint likelihoods for both the user model and universal background models are defined by:

$$P_{ema}(E_{1:T} \mid U_i) = \prod_{t=1}^{T} P(E_t \mid U_i)^{\alpha(1-\alpha)^{T-t}}$$

where $E_{1:T}$ are behavioral events $1, \ldots, T$ that have been observed so far, where $U_i = U_s$ refers to an event where the active user is the account owner, where $U_i = U_o$ refers to the event where the active user is a person other than the account owner, where $P(E_t \mid U_i)$ is a likelihood of behavioral event $E_t$ assuming that the active user is $U_i$, where $P(E_t \mid U_s)$ is a probability score given by the user model, where $P(E_t \mid U_o)$ is a probability score given by the universal background model, and where a refers to a smoothing parameter for an exponential moving average with bias correction.

14. The method of claim 13, wherein the posterior user probability with exponentially smoothed log likelihoods is defined by:

$$P(U_s \mid E_{1:T}) = \frac{P_{ema}(E_{1:T} \mid U_s)P(U_s)}{P_{ema}(E_{1:T} \mid U_s)P(U_s) + P_{ema}(E_{1:T} \mid U_o)P(U_o)}$$

where $P(U_s)$ refers to a prior probability that the active user is the presumed user, and where $P(U_o)=1-P(U_s)$ refers to a prior probability that the active user is not the presumed user.

15. The method of claim 1 further comprising:
preventing access to the at least one computing device or software application when the probability is above a threshold.

16. The method of claim 1 further comprising:
limiting access to the at least one computing device or software application when the probability is above a threshold.

17. The method of claim 16, wherein limiting access comprises one or more of: reducing permissions granted to the active user to the at least one computing device or software application, preventing access to the at least one computing device or software application, triggering an endpoint detection and response routine to log actions of the active user, or logging the observed behavior data.

18. The method of claim 1, wherein the first scores generated by the universal background model and the second scores generated by the user model are both probability scores that are represented as likelihoods.

19. A system comprising:
at least one data processor; and
memory comprising instructions which, when executed by the at least one data processor, result in operations comprising:
iteratively receiving a plurality of sequences of observed behavior data, each sequence of observed behavior data collectively characterizing interaction of an active user with at least one computing device or software application, wherein the active user is presumed to be an account owner having an account associated with login credentials;
for each sequence of observed behavior data:
identifying a sequence of events within the observed behavior data;
scoring each of the events using a universal background model that generates first scores that characterize an extent to which each event or history of events is anomalous for a particular population of users;
scoring each of the events using a user model that generates second scores that characterizes an extent to which each event or history of events is anomalous for the particular user who owns the account;
smoothing the first scores and the second scores using a smoothing function that upweights the first scores and/or the second scores based on recency;
determining, based on the smoothed first scores and the smoothed second scores, a probability that the active user is the account owner associated with the user model; and
providing data indicating the probability.

20. A computer-implemented method comprising:
receiving a sequence of observed behavior data that collectively characterizes interaction of an active user with at least one computing device or software application, wherein the active user is presumed to be an account owner having an account associated with login credentials;
identifying a sequence of events within the observed behavior data;
scoring each of the events using a universal background model that generates first scores that characterize an extent to which each event or history of events is anomalous for a particular population of users, the universal background model being a mixture model trained using historical observed behavior data from a population of users that interacted with the at least one computing device or software application, the mixture model being a mixture of distributions from an exponential family;
scoring each of the events using a user model that generates second scores that characterizes an extent to which each event or history of events is anomalous for the particular user who owns the account;
determining, based on the first scores and the second scores, a probability that the active user is the account owner associated with the user model; and
providing data indicating the probability.

* * * * *